April 16, 1968   W. A. JONES, JR   3,377,724
TREE PUSHER ATTACHMENT FOR BULLDOZERS
Filed May 7, 1965                                    2 Sheets-Sheet 1
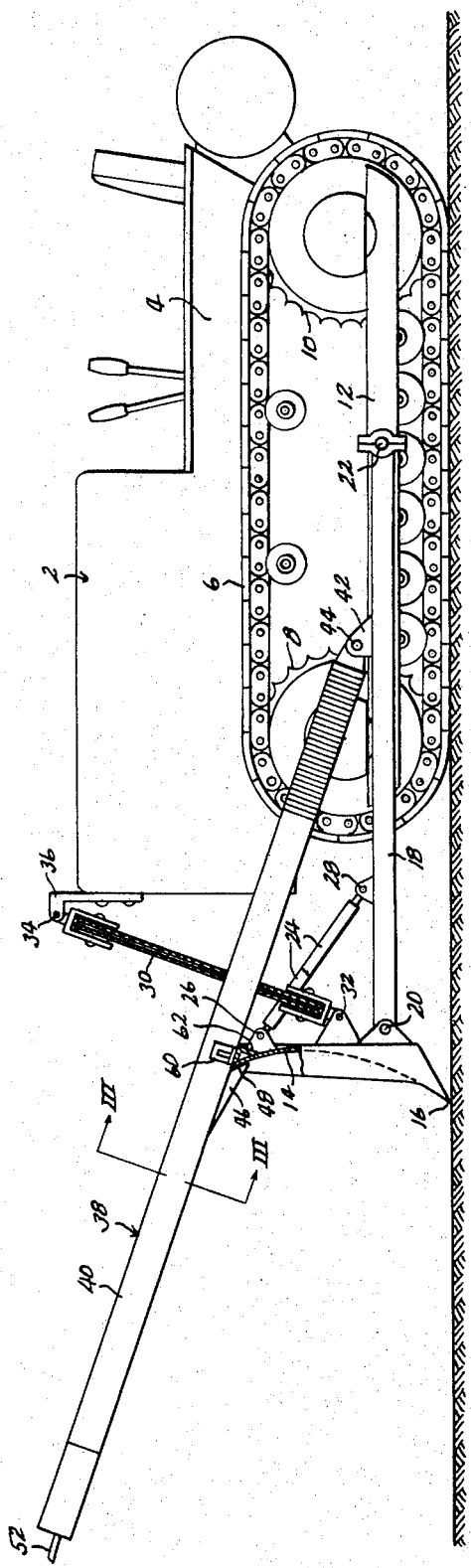
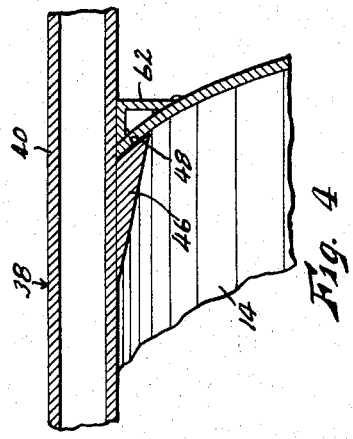
INVENTOR.
William A. Jones, Jr.
BY
John A. Hamilton
Attorney.

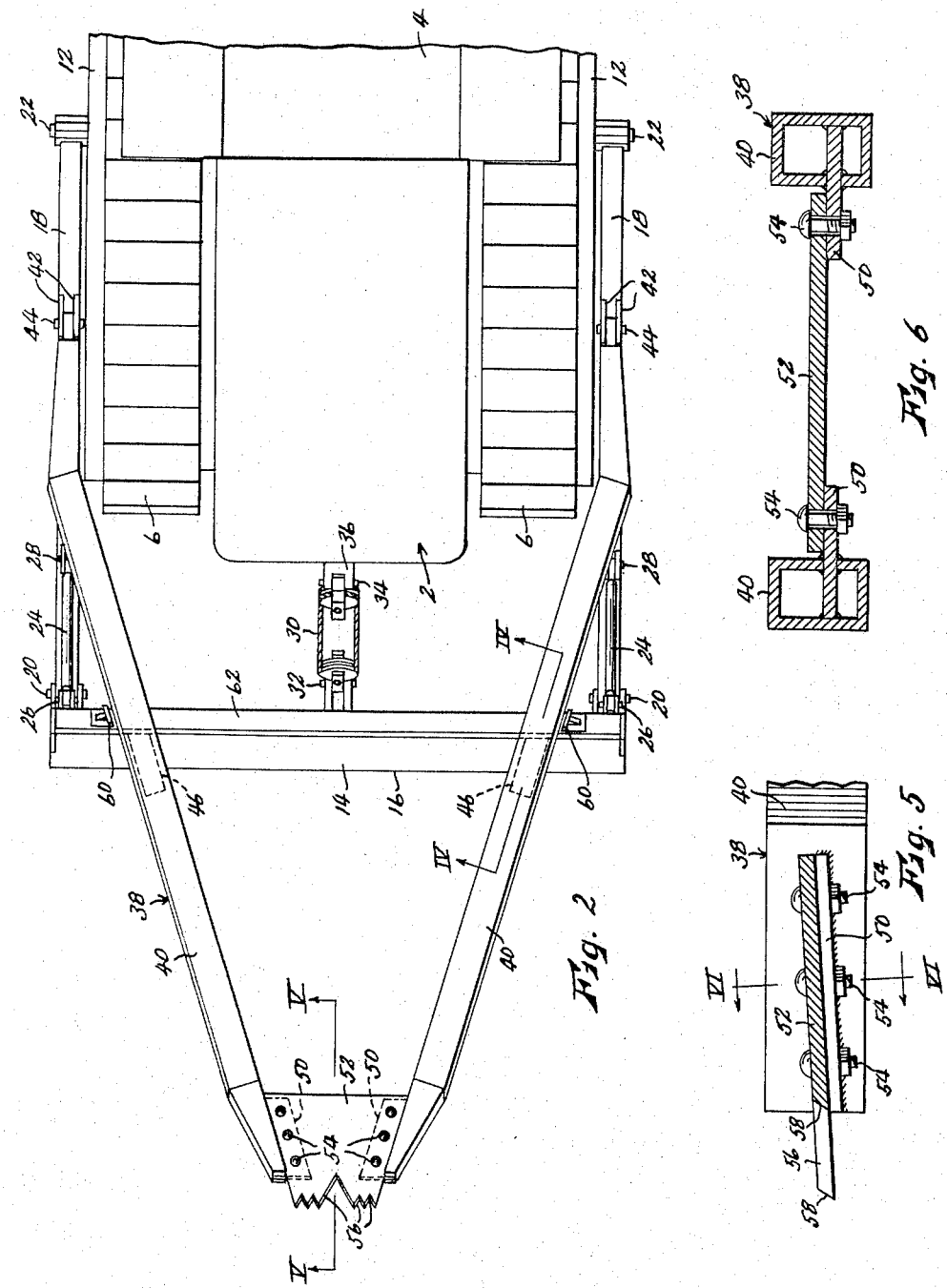

United States Patent Office 3,377,724
Patented Apr. 16, 1968

3,377,724
TREE PUSHER ATTACHMENT FOR BULLDOZERS
William A. Jones, Jr., 710 S. Spring,
Nevada, Mo. 64772
Filed May 7, 1965, Ser. No. 454,104
2 Claims. (Cl. 37—2)

ABSTRACT OF THE DISCLOSURE

A tree pusher attachment for a tractor having a bulldozer constituting a bulldozer blade extending horizontally in front of the tractor by means of pusher beams attached at their forward ends to said blade and connected at their rearward ends to the frame of the tractor for pivotal movement on a horizontal transverse axis, said tree pusher attachment comprising a second pair of pusher beams pivoted at their rearward ends respectively to said first pusher beams, on a horizontal transverse axis, and extending forwardly of said bulldozer blade to rest on the upper edge thereof, and means attaching said second pair of pusher beams to said bulldozer blade.

This invention relates to new and useful improvements in bulldozer equipment, and has as its principal object the provision of an attachment for a bulldozer which particularly and especially adapts said bulldozer for use in pushing over trees.

Of course, ordinary bulldozers are already commonly used for this purpose without benefit of attachments, simply by placing the bulldozer blade against the trunk of the tree and advancing the tractor to apply horizontal force to said tree trunk. However, the usual bulldozer is subject to certain disadvantages in this particular usage. First, the edge of the bulldozer blade can in most assemblies be elevated perhaps only three or four feet above the ground, with the result that force must be applied to the tree relatively close to the ground. A higher point of force application would provide better leverage and permit felling of bigger trees with the same tractor power. Second, most bulldozer blades are positioned rather close to the forward end of the tractor, with the result that the tractor treads often rest directly on the ground through which the roots of the tree must break upwardly, so that the weight of the tractor itself resists such breakage and necessitates greater tractor power. Third, with the usual bulldozer mounting the pusher bars of the blade are often nearly horizontal, so that the strong reactive force in said bars tends to tilt the forward ends of the tractor treads upwardly from the ground, thereby reducing the traction of said treads against the ground by reducing the area of contact therebetween.

Accordingly, the principal object of the present invention is the provision of a tree-pushing attachment for bulldozers which overcomes all of the above described disadvantages, in that it provides for application of force to the tree trunk at a higher elevation above the ground, provides that the tractor may be positioned at a greater distance from the base of the tree, and provides that a greater component of the reactive force when pushing a tree will hold the tractor treads firmly against the ground, than is possible when using such a bulldozer for this purpose without such attachment.

Another object is the provision of a tree-pusher attachment of the character described which is extremely simple and convenient to attach to or remove from the bulldozer, said attachment involving only the insertion of two pivot pins, and which may be elevated or lowered relative to a tree by the usual power apparatus of the tractor.

A further object is the provision of a tree-pusher attachment of the character described which serves the additional function of a hold-down member the bulldozer is used to clear brush and the like, preventing said brush from passing rearwardly over the upper edge of the bulldozer blade.

Other objects are simplicity and economy of construction, efficiency and dependability of operation, and adaptability to be attached to pre-existing bulldozers with a minimum of alterations or additions to the latter.

With these objects in view, as well as other objects which will appear in the course of the specification, reference will be had to the accompanying drawing, wherein:

FIG. 1 is a partially schematic side elevational view of a crawler-type tractor having a tree pusher attachment embodying the present invention mounted operatively thereon, FIG. 2 is a fragmentary top plan view of the structure as shown in FIG. 1, FIG. 3 is a fragmentary sectional view taken on line III—III of FIG. 1, FIG. 4 is an enlarged fragmentary sectional view taken on line IV—IV of FIG. 2, FIG. 5 is an enlarged fragmentary sectional view taken on line V—V of FIG. 2, and FIG. 6 is a sectional view taken on line VI—VI of FIG. 5.

Like reference numerals apply to similar parts throughout the several views, and the numeral 2 applies generally to an ordinary tractor of the crawler type, having a frame 4 supported by a pair of endless ground-engaging tread chains 6, said tread chains extending from front to rear along respectively opposite sides of the tractor frame, each chain being mounted on a pair of sprocket wheels 8 and 10 carried rotatably by the tractor frame, at least one of said sprockets being driven by the power plant of the tractor whereby the tractor is propelled in the usual manner. Further operative details of the tractor are not shown, not being pertinent to the present invention and in any event being well-known to those familiar with the art. At the outer side of each tread chain, tractor frame 4 includes a side rail 12 extending horizontally from front to rear.

The tractor shown is equipped with a generally standard bulldozer attachment including a blade 14 extending horizontally and transversely in front of the tractor, and being disposed in a generally vertical plane. The forward face of said blade is concave, being curved about a horizontal axis, the lower edge thereof forming a cutting edge 16 for cutting into the ground when the bulldozer is used for earth moving and the like, and the upper edge portion thereof being inclined forwardly and upwardly to insure a forward roll or "turn-over" of earth once it has climbed up the entire height of the blade. This is a standard bulldozer blade configuration. The blade is supported by a pair of push bars 18 disposed respectively at opposite sides thereof and extending rearwardly therefrom along the opposite sides of the tractor frame. Each push bar is pivoted at its forward end, as at 20, to the rearward side of blade 14, pivots 20 being horizontal and coaxial, and is pivoted at its rearward end, as at 22, to the associated side rail 12 of the tractor frame, pivots 22 also being horizontal and coaxial. Blade 14 may be adjustably pivoted relative to push bars 18 on pivots 20, whereby to vary the angle of attack of blade edge 16 to the ground, by a pair of turnbuckles 24 respectively connecting said blade to the two push bars 18. Each turnbuckle is pivoted at its upper end to the rearward face of blade 14 at a point above pivot 20, as at 26, is pivoted at its lower end to the associated push bar 18 at a point spaced rearwardly from pivot 20, as at 28, and is of course adjustably extensible in length. Push bars 18 may be pivoted vertically on pivots 22, whereby to vary the elevation of blade 14 above the ground, by any suitable means, that shown consisting of a block-and-tackle hoist indicated generally at 30, the lower end of said hoist being connected at 32 to the rearward face of blade 14, and the upper end of said hoist being connected at 34 to a bracket 36 affixed to the forward end of tractor frame 4. It will be understood that said hoist is power-operated by the tractor power plant.

The tree pusher attachment forming the subject matter of the present invention is indicated generally by the numeral 38, and includes a frame consisting of a pair of pusher beams 40 carried respectively by the push bars 18 of the bulldozer. Each pusher beam is pivoted at its rearward end between a pair of ears 42 welded to the associated push bar at a point intermediate pivots 20 and 22 of said push bar, as by a pivot pin 44 inserted removably through said ears and said pusher beam. As best shown in FIGS. 1 and 2, pusher beams 40 extend substantially straight forwardly to a point approximately even with the front of tread chains 6, then converge forwardly toward each other, said beams resting at points intermediate their ends on the upper edge of blade 14, so as to be inclined upwardly and forwardly, and extending to a point spaced well forwardly of said blade. Welded or otherwise fixed to the lower surface of each beam 40, intermediate its ends, is a hook member 46 constituting in essence a solid block. Said hook member is disposed forwardly of blade 14, and the rearward end thereof is undercut, as indicated at 48, whereby to engage beneath the upper edge portion of blade 14, and thereby to prevent any possibility of upward movement of beams 40 from the blade.

The forward ends of pusher beams 40 are spaced apart as shown in FIG. 2, and each has a mounting plate 50 rigidly welded thereto. A pusher tooth 52 consisting of a heavy steel plate extends between plates 52, and is rigidly but removably secured thereto by a plurality of bolts 54. The forward edge of the tooth plate extends forwardly of beams 40, and is serrated as shown at 56 in FIG. 2, and also the serrated edge is vertically bevelled as shown at 58 in FIG. 5, for purposes to be described. Side-to-side swaying of the pusher attachment frame, consisting of beams 40, is prevented by a pair of upstanding angled clips 60 welded to the upper edge of blade 14, or to the reinforcing portion of said blade such as angle iron 62 which stiffens and reinforces the upper edge of said blade, respectively at the distal sides of said beams. There must of course be sufficient clearance between the clips and the beams, as shown in FIG. 2, to permit the beams to be moved forwardly over the blade enough to permit hooks 46 to engage said blade as previously described.

The operation of the attachment is believed obvious. When the attachment has been mounted on the bulldozer as shown, tooth 52 is moved to the desired elevation, as may be dictated by the size of the tree to be felled as well as by other considerations, by operation of hoist 30. While the tooth is shown at its minimum elevation in the drawing, with bulldozer blade 14 against the ground, it will be understood that the tooth will usually be used at a higher elevation, with blade 14 correspondingly spaced above the ground. The tractor is then advanced to engage tooth 52 against the trunk of the tree, and then advanced still farther to push the tree over and uproot it. The serrations 56 of the tooth prevent said tooth from slipping laterally out of engagement with the tree once pressure has been applied. The bevel 58 of the tooth, while rather obtuse and not forming an edge capable of cutting into the tree trunk to any great degree, nevertheless provides for "shedding" the bark of the tree trunk so that the tooth can gain a firm purchase in the tree trunk, and will not slide upwardly therealong.

The advantages of the tree pusher attachment over use of the blade 14 directly as a means for felling trees are considerable. First, tooth 52 can and does engage the tree trunk at a much higher elevation than blade 14 ever could, thereby providing a much better leverage and permitting the felling of larger trees with a tractor of any given power. Second, tooth 52 is spaced much farther in front of the tractor, and its treads, than blade 14 is or practically could be, so that there is considerable space between the tractor and the base of the tree during the felling operation. This is important since when felling a tree by this method, the trunk itself generally does not break. Instead, the tree roots break beneath the ground level, often at some distance from the trunk, and tear upwardly out of the ground between the tree trunk and the tractor. If the tractor is close to the tree, its considerable weight tends to prevent the roots from tearing free, and thus tends to defeat its own purpose. The spacing of tooth 52 at a greater distance ahead of the tractor largely solves this difficulty.

Third, since tooth 52 is at a higher elevation than blade 14 could ever attain, the reactive compressive load exerted on beams 40 has a larger downward component tending to hold the tractor treads 6 firmly against the ground for better traction. In this connection it will be seen that the bulldozer attachment of the tractor, and the tree pusher attachment, may be considered as a structural unit, pivoted to the tractor frame at 22, and "pivotally" connected to the tree at serrated edge of tooth 52, and that the reactive compressive load referred to above will be applied in this plane. Therefore, if said load is to urge treads 6 flat against the ground for improved traction as described, it will be apparent that a rearward extension of a plane containing blade 52 and pivots 22 must intersect the ground level at a line intermediate sprockets 8 and 10 of the treads. An examination of FIG. 1 will show that this condition does exist in the structure shown even when edge 16 of blade 14 is lowered to ground level, although under this extreme condition the pressure plane referred to above intersects the ground level quite close to rear sprocket 10. However, as mentioned above, the tree pusher is ordinarily used with blade 14 elevated well above the ground, so that said pressure plane intersects the ground level well forwardly of sprocket 10. On the other hand, if edge 16 of blade 14 itself were used as a pusher, then the pressure plane involved would be a plane containing edge 16 and pivots 22, and then only at extreme elevations of the blade, if at all, would said plane intersect the ground level forwardly of sprocket 10. Therefore, when pushing trees with blade 14, there is a pronounced tendency for tread chains 6 to move the tractor forwardly under pivots 22, thereby causing elevation of the forward end of the tractor off of the ground, reducing the area of contact of the treads with the ground, and hence reducing traction power, until slippage of the treads on the ground occurs. Of course, with the tree pusher attachment shown, if the tree should be limber and bend considerably before yielding, so that the point of engagement of tooth 52 against the tree is lowered substantially, it may be necessary to extend hoist 30 slightly in order to prevent the rearward end of the tractor from being elevated above the ground.

Fourth, the tree pusher attachment is extremely simple and convenient to attach to or remove from the bulldozer. The only fastening members required are the two pivot pins 44. These pins may be inserted after first engaging hooks 46 over blade 14, or alternatively the pusher attachment can be mounted by inserting pins 44 first, then, by manipulation of turnbuckles 24, first moving the upper edge of blade 14 rearwardly to allow hooks 46 to drop in front of the blade, then moving the blade forwardly, to engage the undercut ends 48 of said hooks. Also, nearly any bulldozer can be adapted to receive the tree pusher attachment, ears 42 and clips 60 being the only additions necessary to accommodate the attachment.

Finally, it will be seen that the forward and upward extension of beams 40 from blade 14 permits their use as a "hold-down" element when using the bulldozer for clearing brush or other vegetation. Such material of course accumulates to a large volume very rapidly, and then tends to spill rearwardly over the upper edge of blade 14. Beams 40 act to prevent this, holding the brush down and causing it to be compacted into a firm mass rather than spilling over the blade.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A tree pusher attachment for use in connection with a tractor equipped with a bulldozer having a frame including a blade extending horizontally and laterally in front thereof, the upper edge portion of the forward face of said bulldozer blade being inclined upwardly and forwardly, a pair of push bars attached to said blade respectively at opposite sides thereof and extending rearwardly therefrom along opposite sides of said tractor and pivoted at their rearward ends to said tractor for vertical movement, and power means for pivoting said push bars vertically, said tree pusher attachment comprising:

(a) an attachment frame comprising a pair of pusher beams adapted to be pivoted respectively at their rearward ends to said push bars for vertical movement and to rest at points intermediate their ends on the transversely extending horizontal upper edge of said bulldozer blade, so as to extend substantially forwardly and upwardly from said bulldozer blade, (b) a pusher tooth extending between and rigidly interconnecting the forward ends of said pusher beams, and (c) means for preventing upward movement of each of said pusher beams relative to said blade, said means comprising a hook member consisting of a block affixed to the lower side of said beam forwardly of said blade and depending therefrom, the rearward end surface of said block being inclined upwardly and forwardly whereby to hook under the upper edge portion of the forward face of said blade.

2. The structure as recited in claim 1 wherein said blade is connected to said push bars for adjustable pivotal movement about an axis parallel to the pivotal connection of said pusher beams to said push bars, whereby the upper edge portion of said blade may be moved into and out of engagement with said hook members.

References Cited
UNITED STATES PATENTS

| | | | |
|---|---|---|---|
| 2,173,406 | 9/1939 | Wilkinson | 37—2 |
| 2,716,823 | 6/1955 | Mullin | 37—2 X |
| 2,735,197 | 2/1956 | Struemph | 37—2 |
| 3,084,727 | 4/1963 | Basham | 37—2 X |
| 3,243,903 | 4/1966 | Helmuth | 37—2 |

ABRAHAM G. STONE, *Primary Examiner.*

R. L. HOLLISTER, *Assistant Examiner.*